UNITED STATES PATENT OFFICE.

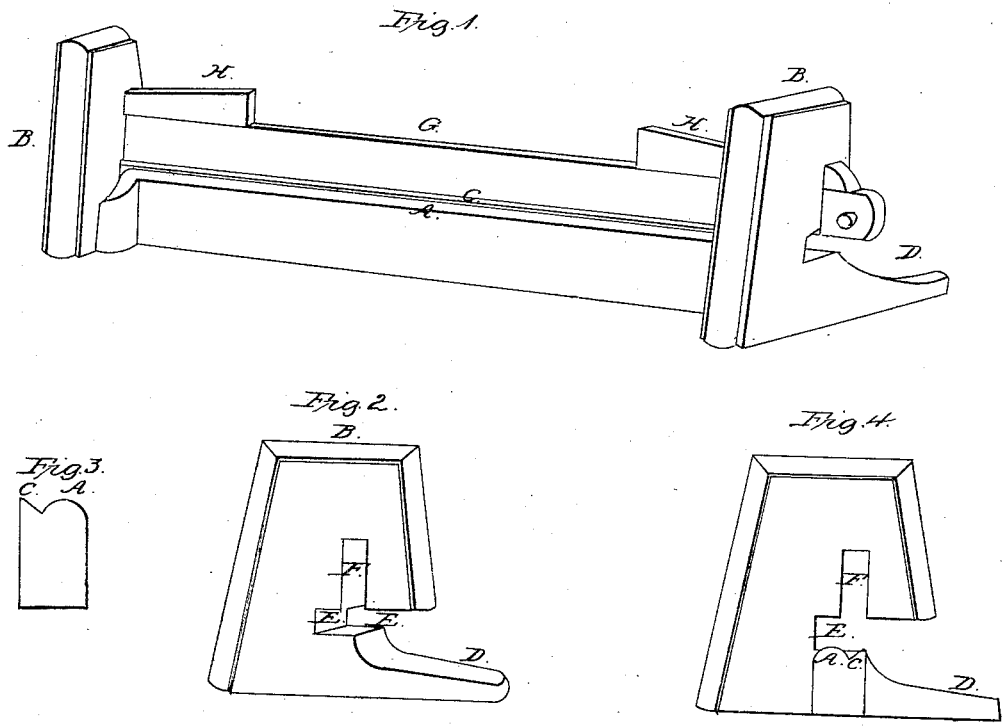

JOSEPH BEACH AND DAVID CULVER, OF HARTFORD, CONNECTICUT.

SAW-SET.

Specification of Letters Patent No. 1,331, dated September 20, 1839.

*To all whom it may concern:*

Be it known that we, JOSEPH BEACH and DAVID CULVER, of the city and county of Hartford and State of Connecticut, have invented a new and useful Machine for Setting Saws; and we do hereby declare that the following is a full and exact description.

The nature of our invention consists in constructing a machine, of any size required, composed of iron or solid materials, in which a saw may be placed, and conveniently and firmly held during the process of setting the teeth:—

To enable mechanics and others to make and use our invention we will proceed to describe its construction and operation—

Figure 1 of the drawings annexed, represents a perspective view of our machine. It consists of two head-blocks or ends as represented by Fig. 2 and Fig. 4, letter B in the said drawings, which are connected by a bar, the bottom of which is upon a level with the bottom of the head blocks; the top of the said connecting bar is represented by letters A and C in Figs. 1, 3 and 4, having a curved surface A, upon the upper side, which serves as a bed upon which to set the saw teeth; also a rest C to gage and guide the same. In the center of each head block, and directly over the bead A and rest C is a notch and slot, represented by letters E and F, Fig. 2 and Fig. 4. A flat bar, as shown by letter G, Fig. 1, is placed through the slots F F, projecting outside of the head blocks sufficiently to admit a small pin in each end to keep it in place directly over the center of bead A and rest C. The saw is placed upon the rest C with the teeth over the bead A, and held in that position by letting down the bar G, which is forced upon the saw plate by means of two wedges represented by H, H, Fig. 1, which placed in the slots F, F, directly over the bar G, and retained in that situation by means of knobs on the outer ends of each may be driven or loosened at pleasure by a common hammer. The saw thus placed may be set more or less by giving the teeth a gentle curve over the bead A, by the aid of hammer and punch or nail set.

Fig 1 in the annexed drawings represents our machine in a perspective view; Fig. 2, the outside view of the head blocks. Fig. 3, shows the form of the connecting bar between the head blocks with an end view of the bead A and rest C. Fig. 4 represents the inside of the head blocks showing the relative position of the bead A, and rest C, with the notch and slot E and F.

What we claim as our invention and desire to secure by Letters Patent, is—

The combination of the bead A, with the rest C, attached to the head blocks, and these in combination with the bar G for the purposes herein described.

JOSEPH BEACH.
DAVID CULVER.

Witnesses:
WM. R. COVER,
RALPH CALLENDER.